(12) United States Patent
Gao et al.

(10) Patent No.: US 6,325,123 B1
(45) Date of Patent: Dec. 4, 2001

(54) TIRE INFLATION SYSTEM FOR A STEERING KNUCKLE WHEEL END

(75) Inventors: Oinghong Kevin Gao, Statesville; Steve Bird, Mooresville, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/471,156

(22) Filed: Dec. 23, 1999

(51) Int. Cl.[7] .................................................. B60C 23/10
(52) U.S. Cl. .............................................. 152/416; 152/417
(58) Field of Search ...................................... 152/415, 416, 152/417; 277/358

(56) References Cited

U.S. PATENT DOCUMENTS

| | | |
|---|---|---|
| 1,103,833 | 7/1914 | Ragan . |
| 1,234,962 | 7/1917 | Tarbet . |
| 3,705,614 | 12/1972 | Juttner et al. . |
| 4,154,279 * | 5/1979 | Tsuruta ................................. 152/416 |
| 4,418,737 * | 12/1983 | Goodell et al. ...................... 152/417 |
| 4,431,043 * | 2/1984 | Goodell et al. ...................... 152/416 |
| 4,434,833 | 3/1984 | Swanson et al. . |
| 4,640,331 | 2/1987 | Braun et al. . |
| 4,705,090 * | 11/1987 | Bartos ................................. 152/417 |
| 4,754,792 | 7/1988 | Braun et al. . |
| 4,804,027 | 2/1989 | Runels . |
| 4,825,925 * | 5/1989 | Schultz ............................... 152/415 |
| 5,203,391 * | 4/1993 | Fox ..................................... 452/416 |
| 5,221,381 * | 6/1993 | Hurrell, II .......................... 152/416 |
| 5,236,028 * | 8/1993 | Goodell et al. ...................... 152/416 |
| 6,182,727 * | 2/2001 | Beesley .............................. 152/417 |
| 6,199,611 * | 3/2001 | Wernick .............................. 152/417 |

* cited by examiner

*Primary Examiner*—S. Joseph Morano
*Assistant Examiner*—Long Bao Nguyen
(74) *Attorney, Agent, or Firm*—Liniak, Berenato, Longacre & White

(57) ABSTRACT

A central tire inflation system for a steering knuckle wheel end assembly providing a steering knuckle secured to the vehicle, and a wheel end hub rotatably mounted about the steering knuckle. A bearing assembly is disposed between the steering knuckle and wheel end hub to establish the rotatably connection. A drive shaft is rotatably disposed through the steering knuckle and is in driving connection with the wheel end hub. A pair of adjacent rotary seals are disposed between the wheel end hub and steering knuckle and defining a small chamber there between. An inlet passage is formed directly through the steering knuckle in communication with the sealed chamber. The inlet passage transmits pressurized air from a pressurized air source directly to the sealed chamber. An outlet passage is formed directly through the wheel end hub and is also in direct communication with the sealed chamber to establish communication between the wheel end hub and the steering knuckle. The arrangement provides a shortened reliable flowpath between a steering knuckle and wheel end hub in a live full float assembly.

9 Claims, 1 Drawing Sheet

TIRE INFLATION SYSTEM FOR A STEERING KNUCKLE WHEEL END

BACKGROUND OF THE INVENTION a) Field of the Invention

The present invention relates to a central tire inflation system for a steering knuckle wheel end assembly; and more particularly to an inflation system having an inlet passage formed directly through the steering knuckle.

b) Background of the Related Art

Central tire inflation systems for heavy-duty commercial and military vehicles are known in the art. Such systems utilize a source of pressurized air in communication with the vehicle's tires. Pressure sensors monitor the pressure within each tire and the vehicle operator can monitor the tire pressure and remotely control tire inflation. An inherent problem in such systems is the need to create a reliable sealed flow path between the vehicle and the rotating wheel hub.

Central tire inflation systems are usually adapted to provide compressed air from a remote pressurized air source to a pneumatic tire of a motor vehicle. Since the tire is rotating and the pressurized air source is stationary, the typical tire inflation system includes some kind of sealing means located between a stationary member of the wheel end assembly and a rotating tire. The typical tire inflation system also is provided with a conduit that extends from the sealing means through the wheel end assembly to the pneumatic tire. It has been found particularly difficult to design the tire inflation system for live full float steering knuckle wheel end assembly wherein pressurized air is transmitted from the pressurized air source to the tires mounted on steerable wheels of a drive axle. Specifically, heretofore, the prior art has not provided a simple shortened flowpath between the source of pressurized air directly through a live steering knuckle and a rotating driven wheel end hub.

SUMMARY OF THE INVENTION

The present invention alleviates the drawbacks of the related art. The present invention provides a central tire inflation system for a steering knuckle wheel end assembly providing a unique arrangement for a steerable driving axle that minimizes changes in the current production wheel end designs. In the preferred embodiment disclosed, the live wheel end assembly comprises a steering knuckle secured to the vehicle, and a wheel end hub rotatably mounted about the steering knuckle. A bearing assembly is disposed between the steering knuckle and wheel end hub to establish the rotatably connection. A drive shaft is rotatably disposed through the steering knuckle and is in driving connection with the wheel end hub. A pair of adjacent rotary seals are disposed between the wheel end hub and steering knuckle and defines a chamber there between. An inlet passage is formed directly through the steering knuckle in communication with the sealed chamber. The inlet passage transmits pressurized air from a pressurized air source directly to the sealed chamber. An outlet passage is formed directly through the wheel end hub and is in direct communication with the sealed chamber thereby establishing communication between the wheel end hub and steering knuckle. The arrangement provides a shortened reliable flowpath between a steering knuckle and wheel end hub in a live full float assembly and separates the pressurized air from the lubricating axle fluid and reduces such lubricating fluid contamination into the tires. The present design also requires less seals than the related art and provides a simpler inboard arrangement reducing manufacturing costs and assembly time to provide an overall superior seal interface arrangement reducing potential leakage and increasing reliability. Other objects and advantages of the invention will become apparent from a study of the following specification when viewed in light of the accompanying drawings.

DETAILED DESCRIPTION OF THE PREFFERED EMBODIMIENT

Figure 1:
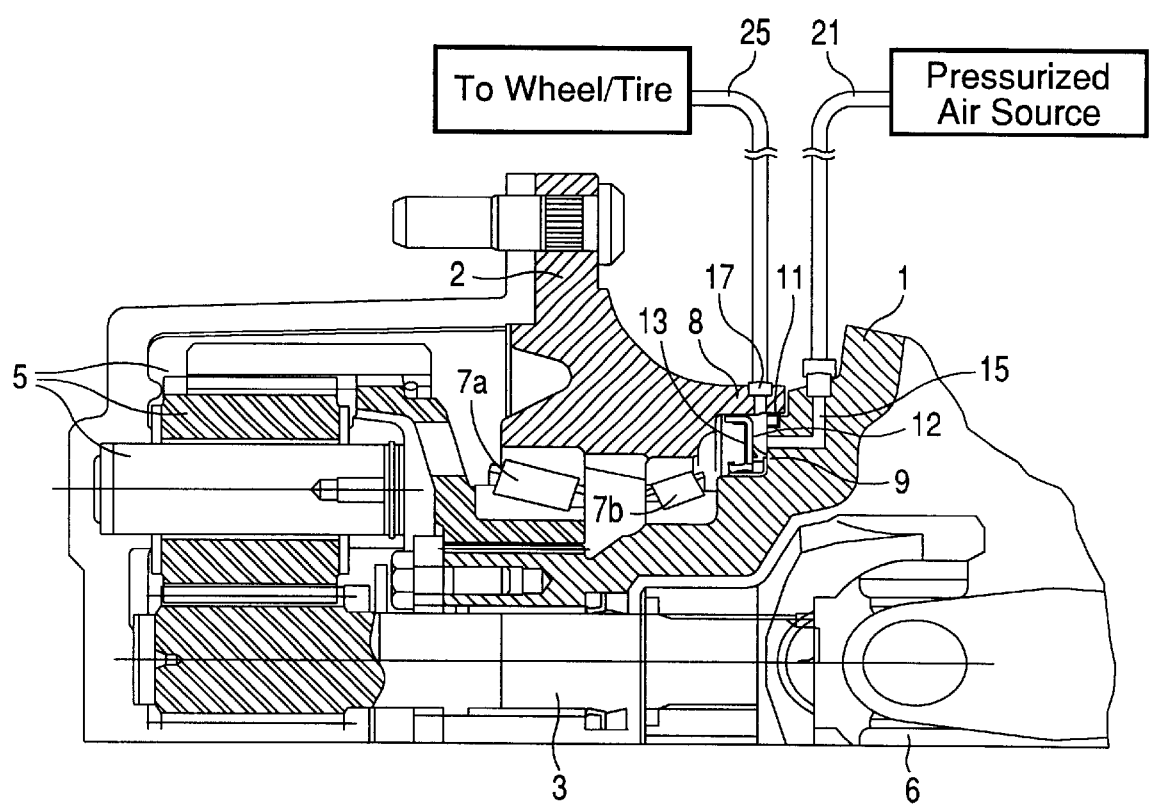
FIG. 1 is a partial section view of the steering knuckle wheel end assembly and central tire inflation system according to the present invention.

FIG. 1 depicts a full float wheel end assembly having a steering knuckle 1 secured to a vehicle suspension system through a conventional king pin assembly or other conventionally known means (not shown) and a wheel end hub 2 rotatably mounted there about. A diving axle 3 is rotatably supported within the steering knuckle 1 for positively driving the wheel end hub 2 and is provided with a universal joint 6 to allow the steering knuckle 1 and wheel end assembly to turn about a steering axis. A planetary gear assembly 5 is disposed between the driving axle 3 and the wheel end hub 2 to provide torque reduction as is conventionally known in the art. A pair of tapered roller bearings 7a & 7b forming part of a bearing assembly are disposed between the wheel end hub 2 and the steering knuckle 1 to form the rotatable connection there between. The wheel hub 2 is secured to a wheel and tire assembly (not shown) having an air inlet means as is conventionally known in the art.

The wheel end hub 2 has a flanged portion 8 immediately positioned adjacent a stepped portion 9 of the steering knuckle 1. A first rotary seal 11 forms a first annular airtight seal between the wheel end hub 2 and the steering knuckle 1. A second annular rotary seal 13 forms an air tight and oil tight seal between the an internal annular surface of the wheel end hub 2 and an external annular surface of the steering knuckle 1. The second rotary seal 13 serves not only to provide a gas tight seal but also contain lubricating oil within a cavity housing the bearing assembly and planetary gear assembly 5. The flanged portion 8 of the wheel end hub 2, stepped portion 9 of the steering knuckle 1, first rotary seal 11, and second rotary seal 13 define an annular sealed chamber 12. The first 11 and second 13 rotary seals are positioned closely adjacent one another to define a relatively small sealed chamber 12 with no additional members there between. The sealed chamber 12 serves as an interface for between the wheel end hub 2 and steering knuckle 1 to establish a gas tight communication there between.

An inlet passage 15 in the form of a bore extends directly through the steering knuckle 1 leading from a radial external surface continuously to the sealed chamber 12. Similarly an outlet passage 17 in the form of a bore extends from a radial external surface of the flanged portion 8 of the wheel end hub 2 and directly and continuously extends to the sealed chamber 12. The first and second rotary seals 11, 13 and the inlet and outlet passages 15, 17 are all disposed in close proximity to one another to form a shortened and tight flowpath for pressurized air to cross the interface between the steering knuckle 1 and wheel end hub 2.

An inlet conduit 21 is provided to establish air communication between the pressurized air source 23 and the inlet passage 15 of the steering knuckle 1. Similarly, an outlet conduit 25 is provided to establish communication between the outlet passage 17 of the wheel end hub 2 and the tire/wheel assembly (not shown) as is known in the art. Each of the inlet and outlet passages 15, 17 and first and second rotary seals 11, 13 are located inboard of the bearing assembly and planetary gear set 5 to form a completely inboard air passage between the steering knuckle 1 and wheel end hub 2. Pressurized air is able to flow through the inlet passage 15 into the annular sealed chamber 12. As the wheel end hub 2 rotates together with the outlet passage 17, air communication is maintained between the sealed chamber 12 and the outlet passage 17. Thus air may continuously flow between the pressurized air source, through the inlet passage 15, sealed annular chamber 12, and outlet passage 17 to the wheel/tire assembly despite relative rotation between the wheel end hub 2 and steering knuckle 1.

The pressurized air source is preferably controlled through a PLC controller to selectively supply pressurized air to the wheel/tire assembly in response to an automatic tire pressure monitoring system or manual pressure system as conventionally found in the art. The present invention provides a short inboard air passage directly through a steering knuckle 1 and through an immediately adjacent portion of the wheel end hub 2 to form a shortened tight interface. The present configuration provides increased reliability of the seals and overall leakage in the tire inflation system of a full float steerable wheel end arrangement which is contributable to the direct passage through the steering knuckle.

The inlet and outlet conduits 21, 25 are preferably made of metal tubing but can be made of flexible airtight material as is known in the art. Fittings between the conduits 21, 25 may simply threaded into the bores forming the inlet and outlet passageways 15, 17 in a gas tight manner as is known in the art. A sealant may be simply be disposed within the inlet and outlet passages 21, 25 prior to securing the fittings to provide the gas tight seal.

While the foregoing invention has been shown and described with reference to a preferred embodiment, it will be understood by those possessing skill in the art that various changes and modifications may be made without departing from the spirit and scope of the invention.

What is claimed is:

1. A vehicle live steering knuckle wheel end assembly including a tire inflation system providing pressurized air directly through said wheel end assembly, said assembly comprising:

a steering knuckle having an inlet passage formed directly through said knuckle, said inlet passage connected to a source of pressurized air;

a wheel hub rotatable connected about said steering knuckle and having an outlet passage formed directly there through;

a bearing assembly disposed between said wheel end hub and said steering knuckle to form said rotatable connection there between;

a drive axle rotatably mounted within said steering knuckle and in driving connection with said wheel hub, said drive axle extending in a longitudinal direction from an inboard side of said wheel end assembly to said driving connection with said wheel hub;

a first and second rotary seal each disposed between said steering knuckle and said wheel hub, said first and second rotary seals being adjacent one another and defining a small sealed chamber there between;

wherein, said inlet and outlet passages are in direct communication with said seal chamber thereby establishing communication between said source of pressurized air and said wheel hub, said inlet and outlet passages and said first and second rotary seals all being located longitudinally inboard said bearing assembly.

2. The steering knuckle wheel end assembly according to claim 1, wherein a planetary gear assembly is disposed between said driving axle and said wheel end hub.

3. The steering knuckle wheel end assembly according to claim 1, wherein said inlet passage includes a bore extending from an external surface of said steering knuckle directly through said steering knuckle and continuously leading to said sealed chamber, said outlet passage being formed as a radial bore extending from a radial external surface of said wheel end hub directly and continuously leading to said sealed chamber.

4. The steering knuckle wheel end assembly according to claim 3, said assembly further comprising a first conduit leading from said inlet passage to said source of pressurized air and a second conduit connected to said outlet passage for connection to a pneumatic tire.

5. The steering knuckle wheel end assembly according to claim 1, wherein said bearing assembly comprises a pair of spaced apart tapered rolling bearings.

6. The steering knuckle wheel end assembly according to claim 1, wherein the first and second rotary seals are disposed between an external peripheral surface of said steering knuckle and an internal peripheral surface of the wheel end hub.

7. The steering knuckle wheel end assembly according to claim 3, wherein said radial bore extending from a radial external surface of said wheel end hub directly to said sealed chamber is entirely disposed longitudinally between said first and second rotary seals in said longitudinally direction.

8. The steering knuckle wheel end assembly according to claim 9, wherein said outlet passage and said radial bore extends along a single straight radial long along an entire length thereof, said inlet passage extends along only two straight lines, said inlet passage having a first longitudinally extending passage extending along a first straight line and a second radialy extending passage extending along a second straight line, said first and second passages being in communication and forming a complete continuous passage between said sealed chamber and said external surface of said steering knuckle.

9. A vehicle live full float steering knuckle wheel end assembly including a tire inflation system providing pressurized air directly through said wheel end assembly, said assembly comprising:

a steering knuckle having an inlet passage formed directly through said knuckle, said inlet passage connected to a source of pressurized air;

a wheel hub rotatable connected about said steering knuckle and having an outlet passage formed directly there through;

a bearing assembly including a pair of spaced apart tapered roller bearing disposed between said wheel end hub and said steering knuckle to form said rotatable connection there between; and a first and second annular rotary seal each disposed between an annular internal surface of said wheel end hub and an annular external surface of said steering knuckle, said first and second annular rotary seals being adjacent one another and defining a small sealed chamber there between;

a longitudinally extending drive axle extending from an inboard side of said wheel end assembly to said wheel hub, said drive axle being rotatably mounted within said steering knuckle and in driving connection with said wheel hub, said driving axle having a universal joint to allow steering movement of said driving axle and said steering knuckle together with said wheel end hub;

a planetary gear set assembly disposed between said driving axle and said wheel end hub to provide torque reduction there between;

wherein, said inlet and outlet passages are in direct communication with said seal chamber thereby establishing communication between said source of pressurized air and said wheel hub, said inlet passage includes a bore extending from an external surface of said steering knuckle directly through said steering knuckle and continuously leading to said sealed chamber, said outlet passage being formed as a radial bore extending from a radial external surface of said wheel end hub directly and continuously leading to said sealed chamber, and said inlet and outlet passages and said first and second rotary seals all being located longitudinally inboard of said spaced apart tapered roller bearings.

\* \* \* \* \*